Patented Apr. 20, 1948

2,439,914

UNITED STATES PATENT OFFICE 2,439,914

FOOD ACCESSORY SUBSTANCE

Willem J. van Wagtendonk, Corvallis, Oreg., assignor to Research Corporation, New York, N. Y., a corporation of New York No Drawing. Application March 18, 1946,
Serial No. 655,377

13 Claims. (Cl. 99—22)

This invention relates to a new food accessory substance, to methods of producing the new substance, and to foodstuffs containing the new substance.

It has been found that by the extraction of sugar producing plants, such as sugar cane and sorghum, or of portions thereof, such as expressed or residual juice of the plants, including the molasses left as a residue in the production of sugar from such juices, with an organic liquid solvent, such as a lower aliphatic ether, a substance is obtained which is of value as a medicinal and food accessory. The extraction of the sugar producing plants may be effected by treating with a suitable solvent either the entire or the macerated plant, the expressed juices, residual plant substances such as sugar cane waste or sugar cane pulp, or the molasses obtained in the production of sugar from the juices.

The most noteworthy physiological property of the new substance so far determined is its ability to prevent or relieve stiffness of the joints in animals. It is believed that this property is due to the effect of the new substance on the calcium assimilation and deposition functions of the animal body and further useful physiological properties are therefore anticipated as a result of investigations made possible by this invention.

A physiological unit of the new substance has been arbitrarily defined as the daily amount of the substance effective to cure an affected guinea pig raised on a prescribed diet (van Wagtendonk, J. Biol. Chem., 155, 1944), when said daily dose is administered for five consecutive days.

The substance obtained by the extraction of cane juice with ether and elimination of solvent contains about 1,000,000 units per gram and for many purposes is highly useful in this form. However, by further methods of treatment, such as distribution between immiscible solvents, for example, by extracting a liquid hydrocarbon solution of the substance with a lower aliphatic alcohol, selective adsorption with magnesium oxide, and molecular distillation, the concentration of the active substance may be increased to as much as 500,000,000 units per gram. Anyone or all of these further treatments may be used to obtain the active substance in the desired concentration.

A typical method of extracting the new substance from sugar cane juice as well as typical methods of increasing the concentration of the active substance is given below to illustrate the principles of the invention.

1. Extraction with ether

Fifty-five gallons of crude cane juice (100 u. per g.; total 20,000,000 u.) are extracted at room temperature in a semi-continuous extraction apparatus. It is advantageous to pass the cane juice through a stationary column of ethyl ether. In this way, emulsification is considerably less than if the ether were to flow through the cane juice. The extraction tower is filled with wooden blocks (2 x 2 x 2 cm., pre-extracted with ethyl ether) which are thoroughly soaked in cane juice. The tower is then charged with five gallons of ethyl ether and the cane juice is passed through it at the rate of 55 gallons per 4-5 hours. After six extractions the tower is drained and the emulsion centrifuged to recover the ether extract. The tower is refilled with ether and the extraction continued. A four-day extraction (4 charges of ethyl ether, total 24 runs) is sufficient to extract all of the active material. The ether extract of each run is washed three times with 3 liters of water, dried over anhydrous sodium sulfate and concentrated in a stream of nitrogen. Yield: 17 g. of a dark-green wax; 1,000,000 u./g., total 17,000,000 u.

2. Distribution between immiscible solvents

The wax obtained from the extraction is dissolved in 1 liter petroleum ether (Skellysolve H) and four to five times extracted with 1 liter of 90% methanol. The active substance remains in the petroleum ether layer. After drying over anhydrous sodium sulfate the solution is concentrated in a nitrogen atmosphere. Yield: 11 g. of a green wax; 1,500,000 u./g.; total 16,500,000 u.

3. Selective adsorption with magnesium oxide

The green wax from the distribution step is dissolved in 500 cc. of a petroleum ether-benzene mixture (9:1). Twenty-five to 40 g. of magnesium oxide (adsorptive powdered magnesia #2641, California Chemical Company, Newark, California) is added. The mixture is thoroughly shaken. After centrifuging the pale yellow supernatant solution, containing the active substance, is again concentrated in a stream of nitrogen. Yield: 6 g. of an orange wax; 10,000,000 u./b.; total 60,000,000 u. This treatment apparently removes an antagonistic factor.

4. Molecular sublimation

The orange wax obtained by selected adsorption may be further concentrated by molecular sublimation in a simple pot still. The condensing surface is advantageously cooled with a dry ice-acetone mixture. The vacuum is maintained at 0.1 micron. At a bath temperature of 70° a yellow inactive oil condenses at the cooled surface. At a bath temperature of 140°–170° the active substance, mixed with some oil, condenses at the surface of the cold finger. This product may be further purified and converted into a white crystalline substance of high activity by fractional crystallization or by chromatographic absorption. A further molecular sublimation is also advantageous in the removal of inactive material.

For example, the molecular sublimate is dissolved in benzene and nine volumes of 95% ethanol are added. After standing overnight in the ice box, the precipitate is filtered, washed with cold ethanol benzene mixture (1:9) and the solvent removed under vacuum. The dry material is subjected to a further molecular sublimation. The now white molecular sublimate on repeated recrystallization from purified petroleum ether gives white leaflets melting at 81.5°–82° C.; empirical formula: $C_{29}H_{59}O$; yield: 0.1 g.; 500,000,000 u./g.; total 50,000,000 u.

The substance obtained at any stage of the illustrative method described above may be administered to ailing animals or fed to sound animals as a protective measure. In view of the high effective value of even the material obtained directly from the ether extraction of the cane juice, the material in this form, and in its more concentrated forms, may advantageously be added to foodstuffs of various kinds without affecting the appearance or palatability of the foodstuff.

A wide variety of organic liquid solvents may be used in extracting the plants or portions thereof including aliphatic and aromatic hydrocarbons, such as petroleum ether, benzene, toluene and xylene; chlorinated hydrocarbons, such as chloroform, carbon tetrachloride, ethylene dichloride, propylene dichloride, trichlorethylene and butyl chloride; lower alkyl ethers, such as ethyl ether, propyl ether and dichloro ethyl ether; ketones, such as acetone, methyl ethyl ketone, methyl isobutyl ketone, diisobutyl ketone, methyl n-amyl ketone and cyclohexanone; and lower fatty acid esters, such as ethyl acetate, methylamyl acetate, ethylbutyl acetate and cyclohexyl acetate. When extracting plant juices such as expressed sugar cane juice, it is, of course, preferable to use a water-immiscible solvent.

This application is a continuation-in-part of my application Serial No. 585,009, filed March 26, 1945, now abandoned.

I claim:

1. A method of obtaining a physiologically active substance which comprises extracting a plant of the group consisting of sugar cane and sorghum with an organic liquid solvent.

2. A method of obtaining a physiologically active substance which comprises extracting the juice of a plant of the group consisting of sugar cane and sorghum with a water-immiscible organic solvent.

3. A method of obtaining a physiologically active substance which comprises extracting the juice of a plant of the group consisting of sugar cane and sorghum with a lower alkyl ether.

4. A method of obtaining a physiologically active substance which comprises extracting a plant of the group consisting of sugar cane and sorghum with an organic liquid solvent and treating a solution of the extracted substance with magnesium oxide.

5. A method of obtaining a physiologically active substance which comprises extracting a plant of the group consisting of sugar cane and sorghum with an organic liquid solvent and extracting a liquid hydrocarbon solution of the extracted substance with a lower aliphatic alcohol.

6. A method of obtaining a physiologically active substance which comprises extracting a plant of the group consisting of sugar cane and sorghum with an organic liquid solvent and subjecting the extracted substance to fractional molecular sublimation.

7. A method of obtaining a physiologically active substance which comprises extracting sugar cane juice with ethyl ether.

8. A method of obtaining a physiologically active substance which comprises extracting a plant of the group consisting of sugar cane and sorghum with an organic liquid solvent, extracting a liquid hydrocarbon solution of the extracted substance with a lower aliphatic alcohol, and treating with a magnesium oxide a solution of the substance remaining in the liquid hydrocarbon.

9. A method of obtaining a physiologically active substance which comprises extracting a plant of the group consisting of sugar cane and sorghum with an organic liquid solvent, extracting a liquid hydrocarbon solution of the extracted substance with a lower aliphatic alcohol, treating with magnesium oxide a solution of the substance remaining in the liquid hydrocarbon, and subjecting the treated substance to fractional molecular distillation.

10. A method of obtaining a physiologically active substance which comprises extracting sugar cane juice with ethyl ether, extracting a petroleum ether solution of the extracted substance with aqueous methyl alcohol, and treating with magnesium oxide a petroleum ether-benzene solution of the substance remaining in the liquid hydrocarbon.

11. A method of obtaining a physiologically active substance which comprises extracting sugar cane juice with ethyl ether, extracting a petroleum ether solution of the extracted substance with aqueous methyl alcohol, treating with magnesium oxide a petroleum ether-benzene solution of the substance remaining in the liquid hydrocarbon, and subjecting the treated substance to fractional molecular distillation.

12. An accessory food substance comprising the solid substance extracted by a lower alkyl ether from the juice of a plant of the group consisting of sugar cane and sorghum.

13. An accessory food substance comprising the solid substance extracted by ethyl ether from sugar cane juice.

WILLEM J. van WAGTENDONK.